US010810034B2

United States Patent
Moolenaar (10) Patent No.: US 10,810,034 B2
(45) Date of Patent: *Oct. 20, 2020

(54) TRANSPARENT DEPLOYMENT OF META VISOR INTO GUEST OPERATING SYSTEM NETWORK TRAFFIC

(71) Applicant: VMware, Inc., Palo Alto, CA (US)

(72) Inventor: Marcel Moolenaar, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,325

(22) Filed: Jan. 28, 2019

(65) Prior Publication Data

US 2019/0179114 A1 Jun. 13, 2019

Related U.S. Application Data

(63) Continuation of application No. 15/420,523, filed on Jan. 31, 2017, now Pat. No. 10,191,762.

(51) Int. Cl.
*G06F 9/46* (2006.01)
*G06F 9/455* (2018.01)
(Continued)

(52) U.S. Cl.
CPC .......... *G06F 9/45558* (2013.01); *G06F 9/455* (2013.01); *G06F 2009/45595* (2013.01); *H04L 47/32* (2013.01); *H04L 61/2007* (2013.01)

(58) Field of Classification Search
None
See application file for complete search history.

(56) References Cited

U.S. PATENT DOCUMENTS 7,757,005 B2  7/2010 Larson et al.
7,792,097 B1  9/2010 Wood et al.
(Continued)

FOREIGN PATENT DOCUMENTS

WO    2014151126 A1    9/2014

OTHER PUBLICATIONS

International Search Report/ Written Opinion Issued to PCT/US2018/014153 dated Aug. 20, 2018.
(Continued)

*Primary Examiner* — Hiren P Patel
(74) *Attorney, Agent, or Firm* — Patterson + Sheridan, LLP (57) ABSTRACT

A technique transparently deploys an operating entity (OE) into a network data path of a virtualized computing environment that includes a guest operating system (OS) running in a virtual machine instance (VMI) of a virtual data center (VDC). The OE is embodied as an intermediary manager, e.g., a meta-hypervisor (metavisor), of a computing cell within the VMI that includes the guest OS and associated applications. The computing cell is layered over a hypervisor which manages system resources of the VDC in an arrangement such that the metavisor is disposed between the hypervisor and guest OS, and operates transparent to the guest OS. The transparent deployment technique involves a set of conditional tests and actions embodied as modules of the metavisor that is applied to examine network packet traffic exchanged over the network data path and that operates to make the presence of the metavisor within the network data path "invisible" (i.e., transparent) to the guest OS, i.e., so that the guest OS is unaware of the presence of the metavisor.

20 Claims, 6 Drawing Sheets

(51) Int. Cl.
*H04L 12/823* (2013.01)
*H04L 29/12* (2006.01)

(56) References Cited

U.S. PATENT DOCUMENTS

| | | | |
|---|---|---|---|
| 8,166,474 B1* | 4/2012 | Delco | G06F 9/45558 709/226 |
| 8,190,778 B2* | 5/2012 | Shanbhogue | G06F 21/53 709/223 |
| 8,363,656 B2 | 1/2013 | Klink et al. | |
| 8,370,834 B2* | 2/2013 | Edwards | G06F 9/5077 709/238 |
| 8,478,853 B2 | 7/2013 | Droux et al. | |
| 8,490,086 B1* | 7/2013 | Cook | G06F 9/45558 718/1 |
| 9,036,464 B2* | 5/2015 | Droux | H04L 45/245 370/228 |
| 9,037,719 B2* | 5/2015 | Shen | H04L 67/1002 709/226 |
| 9,191,454 B2* | 11/2015 | Fries | G06F 9/45558 |
| 9,292,331 B2 | 3/2016 | Lango et al. | |
| 9,306,978 B2 | 4/2016 | Lango et al. | |
| 9,335,932 B2 | 5/2016 | Lango et al. | |
| 9,535,741 B1 | 1/2017 | Lango et al. | |
| 9,578,064 B2 | 2/2017 | Lango et al. | |
| 9,712,386 B1* | 7/2017 | Chen | H04L 41/0806 |
| 9,880,870 B1* | 1/2018 | Danilov | G06F 9/45558 |
| 9,892,256 B1* | 2/2018 | Lango | G06F 21/56 |
| 9,942,130 B2 | 4/2018 | Ulevitch et al. | |
| 9,953,168 B1 | 4/2018 | Lango et al. | |
| 10,191,762 B2* | 1/2019 | Moolenaar | G06F 9/45558 |
| 10,652,281 B1* | 5/2020 | Moolenaar | H04L 63/0263 |
| 2005/0074002 A1 | 4/2005 | Yoakum et al. | |
| 2006/0070066 A1* | 3/2006 | Grobman | H04L 63/12 718/1 |
| 2009/0003828 A1 | 1/2009 | So | |
| 2009/0161640 A1 | 6/2009 | Shin et al. | |
| 2009/0254990 A1* | 10/2009 | McGee | G06F 21/53 726/22 |
| 2010/0100718 A1* | 4/2010 | Srinivasan | G06F 9/5077 713/1 |
| 2011/0194563 A1* | 8/2011 | Shen | G06F 9/45558 370/395.52 |
| 2012/0158887 A1 | 6/2012 | Tsirkin | |
| 2013/0227550 A1 | 8/2013 | Weinstein et al. | |
| 2014/0043964 A1 | 2/2014 | Gabriel et al. | |
| 2014/0279806 A1 | 9/2014 | Ansari et al. | |
| 2014/0282521 A1* | 9/2014 | Lango | G06F 9/45558 718/1 |
| 2015/0229659 A1 | 8/2015 | Tal et al. | |
| 2015/0281059 A1 | 10/2015 | Xiao | |
| 2016/0062781 A1 | 3/2016 | Tsirkin et al. | |
| 2016/0110211 A1* | 4/2016 | Karnes | H04L 43/12 718/1 |
| 2016/0110212 A1 | 4/2016 | Karnes | |
| 2016/0182458 A1 | 6/2016 | Shatzkamer et al. | |
| 2016/0191521 A1 | 6/2016 | Feroz et al. | |
| 2016/0197830 A1* | 7/2016 | Ulevitch | H04L 67/00 370/392 |
| 2016/0246632 A1 | 8/2016 | Tsirkin | |
| 2017/0054686 A1* | 2/2017 | Malkov | H04L 63/145 |
| 2018/0063083 A1* | 3/2018 | Tsirkin | H04L 63/0245 |
| 2018/0181431 A1 | 6/2018 | Vincent et al. | |

OTHER PUBLICATIONS

PCT Search Report dated Jun. 22, 2018 in related PCT Patent Application PCT/US2018/014153.

* cited by examiner

TRANSPARENT DEPLOYMENT OF META VISOR INTO GUEST OPERATING SYSTEM NETWORK TRAFFIC

BACKGROUND

Technical Field

The present disclosure relates to virtualized computing environments and, more specifically, to transparently deploying an operating entity into a network data path of a virtualized computing environment.

Background Information

Many enterprises and their computer systems utilize virtual machines provided by a virtual data center (VDC) of a virtualized computing environment, wherein the VDC furnishes virtualized resources, such as network interfaces that are accessible over network data paths of a computer network. An instance of a virtual machine (virtual machine instance, VMI) may include a guest operating system (OS) configured to utilize system (e.g., hardware) resources of the VDC that are managed by a hypervisor of the VMI. The VMI may also include an intermediary manager configured to manage the guest OS operating within the VMI and implement one or more services that enhance guest utilization of the VDC resources.

Typically, the intermediary manager and guest OS are independent operating entities (OE) such that the intermediary manager can "see" network traffic of the guest OS exchanged over a network data path via the hypervisor. As an OE, the intermediary manager may also exchange network traffic over the network data path via the network interface provided by the VDC. However, provision of a network interface for the VMI by the VDC usually includes assignment of a limited hardware resource, e.g., a network interface hardware address, which is shared by the intermediary manager and guest OS to communicate over the network data path. From the perspective of the VDC, one OE is assigned the hardware address within the VMI which cannot be changed, i.e., the hardware address is fixed by the VDC. As a result, the VDC will "blindly" drop any network packet that does not have the correctly assigned address of the VMI. Therefore, a problem involves managing network traffic to two independent OEs with one hardware address.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments herein are directed to a technique for transparently deploying an operating entity (OE) into a network data path of a virtualized computing environment that includes a guest operating system (OS) running in a virtual machine instance (VMI) of a virtual data center (VDC). The OE is embodied as an intermediary manager, e.g., a meta-hypervisor (metavisor), of a computing cell within the VMI that includes the guest OS and associated applications. The computing cell is layered over a hypervisor which manages system (e.g., hardware) resources of the VDC in an arrangement such that the metavisor is disposed between the hypervisor and guest OS, and operates transparent to the guest OS. The transparent deployment technique involves a set of conditional tests (e.g., branches) and actions embodied as modules of the metavisor that is applied to examine network packet traffic exchanged over the network data path and that operates to make the presence of the metavisor within the network data path "invisible" (i.e., transparent) to the guest OS, i.e., so that the guest OS is unaware of the presence of the metavisor, which may perform transparent encryption/decryption of network packet traffic as well as firewall filtering services. That is, transparent deployment of the metavisor into the guest OS network packet traffic is based on one or more modules configured to provide unique, special-purpose conditional tests and actions that are deployed using "hooks" which are called at particular points of processing of the packets in the metavisor and which enable inspection of the packets at those points to determine whether the packets are part of network traffic directed to the metavisor, to the guest OS, or to a destination external to the VMI (external destination). In essence, the technique enables the metavisor to differentiate the network packet traffic as packets destined for the metavisor, packets destined for the guest OS, or packets for an external destination and, thereafter, forward the packets to the proper destination. The modules are further configured to process packets depending on direction, e.g., depending on a packet ingress interface, such that a first set of modules may be associated with hooks for packets in a "northbound" direction and a second set of modules may be associated with hooks for packets in a "southbound" direction.

Differentiation of the network packet traffic by the transparent deployment technique is achieved through cooperation of various subsystems of the metavisor (i.e., an operating system kernel) including (i) one or more hook modules that enable switching (i.e., forking) of packets between a metavisor network protocol stack and a guest OS network protocol stack, (ii) a firewall/packet filter rule set configured to tag the packets based on examination of network flows of the packets, and (iii) a proxy server configured to handle indistinguishable network flows. Tagging of the packets involves additional state associated with the packet filter rules that is used to identify the network flows of the packets as associated with the metavisor, guest OS, or external destination, and to determine whether those flows are transparently encrypted. In addition, unlike conventional network stacks, the technique reorders application of the firewall/packet filter and transparent encryption/decryption operations to decrypt transparently encrypted packets first, thereby exposing the network flows of packets to ensure that the packet filter rules operate on the network flows to identify an appropriate destination.

In an embodiment, one of the hooks is configured to examine a protocol type contained in the packet to identify a situation where it is uncertain whether a reply associated with a request originated at the guest OS or the metavisor, such as for a link layer protocol. An example of such a protocol is the address resolution protocol (ARP). According to the technique, the situation is resolved by sending the ARP reply to both the metavisor network protocol stack and guest OS network protocol stack. To that end, the technique provides a low-level (i.e., L2 or link layer) hook module that specifies "if the protocol of a reply packet is ARP, send the reply packet to both the metavisor and the guest OS". The technique also provides a higher-level (i.e., L3 or network layer) hook module that is applied when the protocol type of the packet is the internet protocol (IP). Here, the network traffic packets are distinguished based on whether their network flows originated from or are destined to the metavisor (or an external destination in the computer network) based on a packet ingress interface. If a determination is rendered that the network flows for externally (i.e., computer network) originated packets inbound to the VMI are associated with the metavisor, the packets are passed to the network protocol stack of the metavisor; otherwise, the packets are passed to the guest OS network protocol stack, bypassing at least a portion of the network protocol stack of the metavisor.

The determination of whether the network flows are associated with the metavisor or guest OS is performed by firewall functionality embodied as a packet filter (PF) of the metavisor. A network flow of the packet is compared with state maintained at the firewall and, if a match occurs, a determination is rendered that the packet belongs to a flow that should be passed to the guest OS network protocol stack or the metavisor network protocol stack. As used herein, a network flow denotes a 5-tuple that includes information obtained from the internet layer (IP) and transport layer (transport control protocol, TCP and user datagram protocol, UDP) headers of the packet, such as source and destination IP addresses, as well as source and destination port numbers, and protocol type. Thus, packets within the network data path are passed through the PF and tagged, which requires that the states maintained at the firewall contain information about the origin of the flows. Note, however, that the firewall may also provide packet filtering for security purposes, such as blocking ingress or egress packets, packet spoof detection, and IP address blacklisting. For packets received at the metavisor that originate at the guest OS and are destined to the computer network via the hypervisor, state is created at the firewall that is modified with certain direction (outbound/egress) so that return packets received at the metavisor from the hypervisor are matched correctly with the modified state.

Comparison of the network flow of a packet with firewall state requires examination of unencrypted network traffic which, in turn, requires decryption of transparently encrypted incoming packets received at the metavisor from the VDC to obtain the original (5-tuple) network flow information. Based on that original flow information, a determination is rendered as to whether the network packet traffic is allowed or should be blocked. For a conventional network stack, network packet traffic typically passes through the firewall first, prior to decryption. However, according to the transparent deployment technique, application of the firewall packet filter and transparent encryption/decryption (e.g., IPSec) operations are reordered to enable decryption first, prior to firewall processing, so that the firewall can operate on the non-encrypted network flow information. Decryption in this manner allows exposure of the transport layer (TCP or UDP) header information (which is normally hidden/encrypted using IPSec) and, particularly, the port numbers to correctly identify the network flow.

DESCRIPTION

Figure 1:
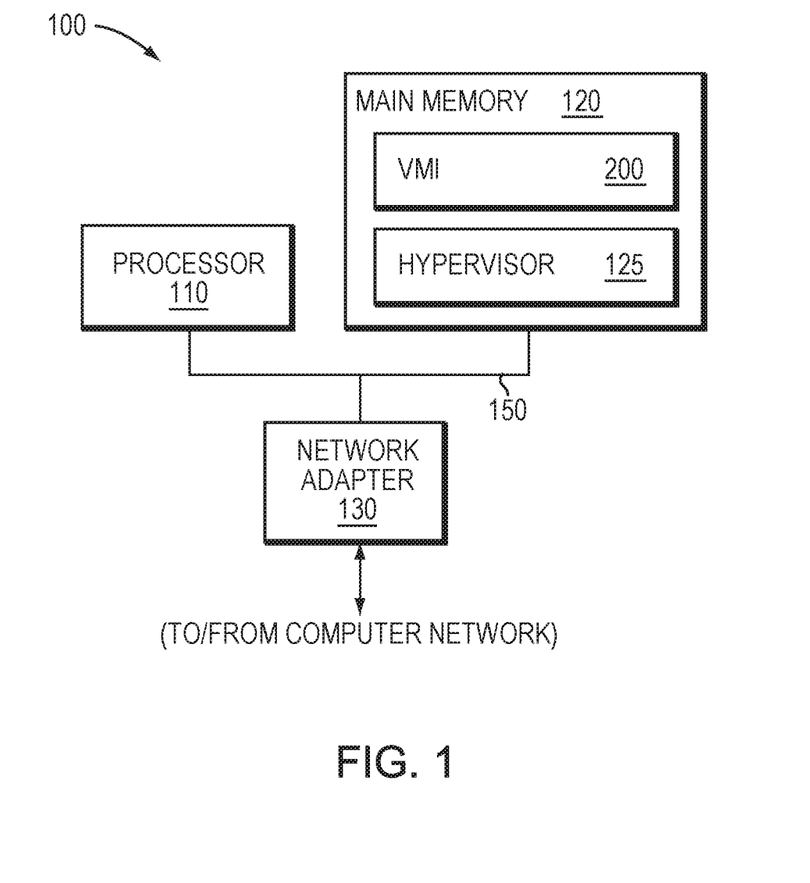
FIG. 1 is a block diagram of a virtualized computing environment.

FIG. 1 is a block diagram of a virtualized computing environment 100 that includes a computer system illustratively embodied as a virtual data center (VDC) configured to provide virtualized resources, such as virtual storage, virtual computing resources, and virtual database resources that are accessible over a network data path of a computer network. The VDC may include one or more processors 110, a main memory 120, and one or more network adapters 130 interconnected by a system bus 150. The network adapter 130 connects the VDC to other computers or nodes over the computer network including point-to-point links, wide area networks, virtual private networks implemented over a public network (such as the Internet) or a shared local area network. Therefore, the network adapter 130 may be embodied as a network interface card (NIC) having the mechanical, electrical and signaling circuitry needed to connect the VDC to the computer network. Communication over the network may be effected by exchanging discrete frames or packets of data according to pre-defined protocols, such as the Transmission Control Protocol/Internet Protocol (TCP/IP), although other protocols, such as the User Datagram Protocol (UDP) may also be advantageously employed.

The main memory 120 includes a plurality of memory locations addressable by the processor 110 and/or network adapter 130 for storing software code (e.g., processes and/or services) and data structures associated with the embodiments described herein. The processor and adapter may, in turn, include processing elements and/or circuitry configured to execute the software code, such as an instance of a virtual machine and a hypervisor 125, and manipulate the data structures. The virtual machine instance (VMI) 200 is managed by the hypervisor 125, which is a virtualization platform configured to mask low-level hardware operations from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein.

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., application, programs stored in memory, alternative embodiments also include the code, processes and programs being embodied as logic and/or modules consisting of hardware, software, firmware, or combinations thereof.

Figure 2:
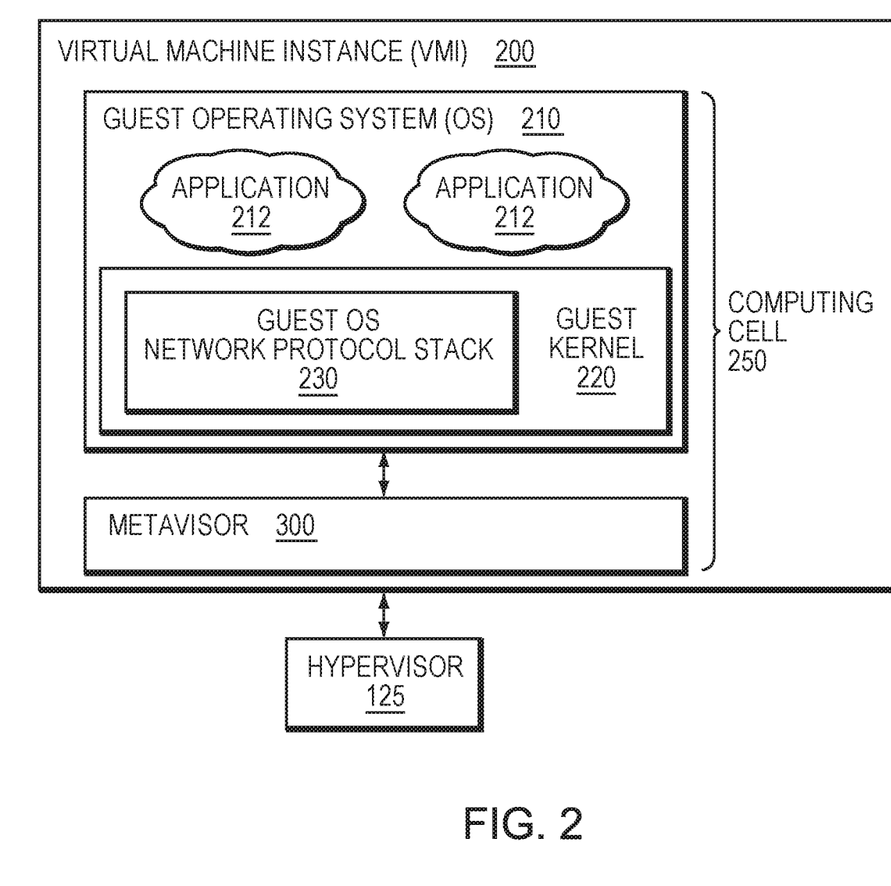
FIG. 2 is a block diagram of a virtual machine instance (VMI) including a metavisor located between a hypervisor and guest operating system (OS)

FIG. 2 is a block diagram of the virtual machine instance (VMI) 200. Guest operating system (OS) 210 and associated applications 212 run in the VMI 200 and may be configured to utilize hardware resources of the VDC. In an embodiment, the guest OS 210 may be the Linux operating system, FreeBSD and similar operating systems; however, it should be noted that other types of guest OSs, such as the Microsoft Windows operating system, may be used in accordance with the embodiments described herein. A guest kernel 220 of the guest OS 210 includes a guest OS network protocol stack 230 for exchanging network traffic over a network data path established by the network adapter 130 via the hypervisor 125. The guest OS may be managed, at least in part, by an intermediary manager, i.e., metavisor 300, which includes logic for enhancing guest utilization of various VDC resources, such as processor 110, main memory 120 and network adapter 130. The VDC resources may be virtualized for the VMI, at least partially with the assistance of the hypervisor 125. The hypervisor may present a software interface for processes within the VMI to communicate requests, e.g., hypercalls, directed to the hypervisor to access the VDC resources.

The metavisor 300 (meta-hypervisor) and guest OS 210 are independent operating entities (OE) arranged such that the metavisor is located between the hypervisor 125 and guest OS 210 within the VMI 200 (i.e., the metavisor is disposed underneath the guest OS and over the hypervisor) and, as such, can "see" the network traffic of the guest OS exchanged over the network data path provided by the network adapter 130 via the hypervisor 125. As an OE, the metavisor 300 is configured to also exchange network traffic over the network data path, wherein the network traffic of the metavisor generally has unique network flows compared to that of the guest OS. However, provision of a network interface (e.g., SBG-IF 360 of FIG. 3) for the VMI 200 by the VDC includes assignment of a limited hardware resource, e.g., a hardware address of the network adapter, which is managed by the hypervisor and shared by the metavisor 300 and guest OS 210 to communicate (i.e., send and receive packets) over the network data path. That is, the hypervisor 125 is configured to manage resources of the VDC including the network adapter 130 to enable sharing of the hardware address between the metavisor 300 and the guest OS used to establish the network path to exchange the packets over the computer network. From the perspective of the VDC, one OE is assigned the hardware address in the VMI 200 that cannot be changed, i.e., the hardware address is fixed by the VDC. As a result, the VDC will "blindly" drop any packet that does not have the correctly assigned address of the VMI. The embodiments described herein are directed to managing network traffic to two independent OEs with one hardware address.

Specifically, the embodiments herein are directed to a technique for transparently deploying an operating entity into a network data path of a virtualized computing environment that includes a guest OS running in a VMI of a VDC such that the deployed operating entity (OE) shares a network interface with the guest OS. The OE is embodied as an intermediary manager (i.e., metavisor 300) of a computing cell 250 within the VMI 200 that includes the guest OS 210 and associated applications 212. The computing cell 250 is illustratively a cloud workload protection platform configured to enable enterprises to run workloads securely in hybrid cloud environments using a single set of security controls, such as transparent encryption (i.e., encryption that is transparent to the guest OS), boot policy, application and data micro-segmentation, and visibility. The metavisor 300 is located at a confluence of the computing cell 250 and includes logic that enables transparent insertion of security services for the cell 250. The computing cell 250 is layered over the hypervisor 125 which manages system (e.g., hardware) resources of the VDC in an arrangement such that the metavisor 300 is disposed between the hypervisor 125 and guest OS 210. Specifically, the metavisor 300 employs an advanced virtualization technique that presents itself to the guest OS 210 as the cloud hypervisor 125, and to the cloud hypervisor 125 as the guest OS 210. Effectively acting as the enterprise's network perimeter, the metavisor 300 implements and enforces the security controls and policies.

The transparent deployment technique involves a set of tests and actions embodied as modules of the metavisor 300 that are applied to examine network packet traffic exchanged over the network data path and that operate to make the presence of the metavisor within the network data path "invisible" (transparent) to the guest OS 210, i.e., so that the guest OS is unaware of the presence of the metavisor, which may perform transparent encryption/decryption of network packet traffic as well as firewall filtering services. That is, transparent deployment of the metavisor 300 into the guest OS network packet traffic is based on a set of modules configured to provide unique, special-purpose conditional tests and actions that are deployed using "hooks" that are called at particular points of processing of the packets in the metavisor and that enable inspection of the packets at those points to determine whether the packets are part of network traffic directed to the metavisor 300, to the guest OS 210, or to a destination external to the VMI (i.e., external destination). In essence, the technique enables the metavisor to differentiate the network packet traffic as packets destined for the metavisor, packets destined for the guest OS, or packets for an external destination and, thereafter, forward the packets to the proper destination. Notably, the hooks are further configured to process packets depending on direction, e.g., depending on a packet ingress interface, such that a first set of modules may be associated with hooks for packets in a "northbound" direction and a second set of modules may be associated with hooks for packets in a "southbound" direction.

Figure 3:
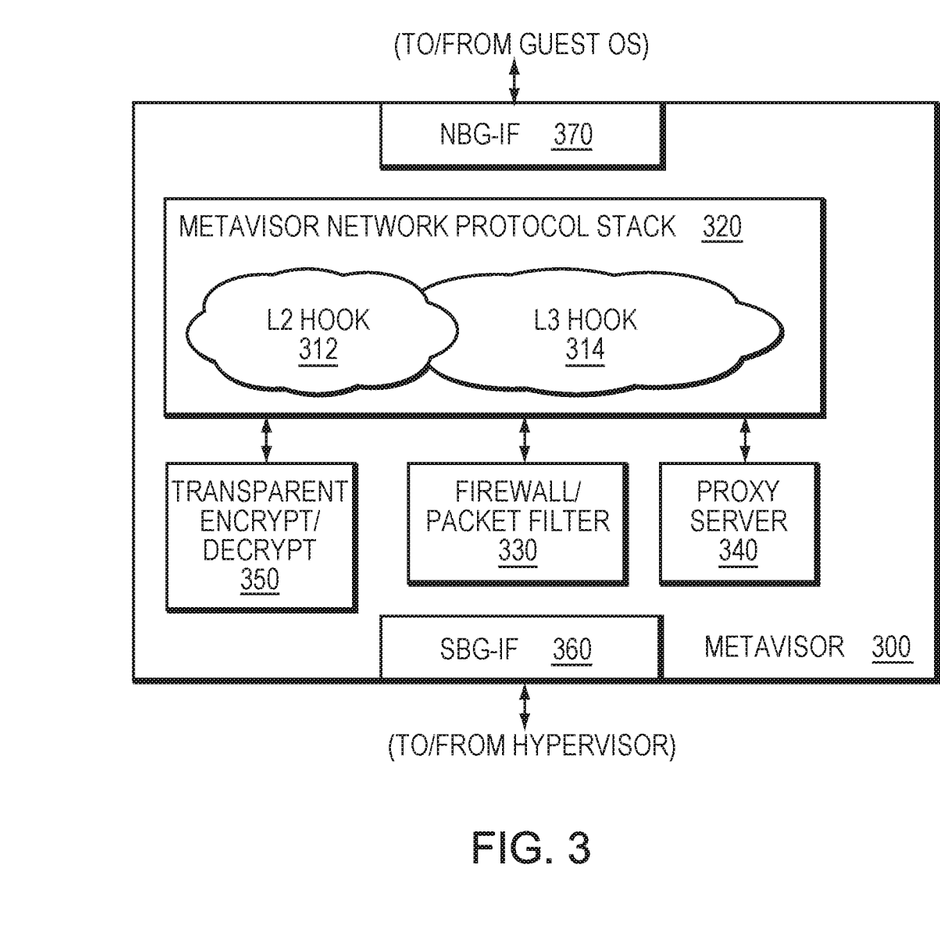
FIG. 3 is a block diagram of the metavisor.

Differentiation of the network packet traffic by the transparent deployment technique is achieved through cooperation of various subsystems of the metavisor and, in particular, of an operating system kernel of the metavisor. FIG. 3 is a block diagram of the metavisor 300. In an embodiment, the metavisor is implemented using the NetBSD OS kernel, although other OS kernels, such as the FreeBSD OS kernel, may also be used. The various subsystems of the metavisor 300 include (i) one or more hook modules 312, 314 that enable switching (i.e., forking) of packets between a metavisor network protocol stack 320 and the guest OS network protocol stack 230, (ii) a firewall/packet filter 330 and associated rule set configured to tag the packets based on examination of network flows of the packets, and (iii) a proxy server 340 configured to handle indistinguishable network flows. Tagging of the packets involves additional state associated with the packet filter rules that is used to identify the network flows of the packets as associated with the metavisor 300, the guest OS 210, or an external destination (i.e., destination in the computer network), and to determine whether those flows are transparently encrypted. Notably, the guest OS may provide its own encryption/decryption of packets, which are "passed-thru" the metavisor to/from an external destination. In addition, unlike conventional network stacks, the technique reorders application of the firewall/packet filter 330 and transparent encryption/decryption 350 (e.g., IPSec) operations to decrypt transparently encrypted packets first, thereby exposing the network flows of packets to ensure that the packet filter rules operate on the network flows. The metavisor may provide transparent encryption/decryption of packets to/from the metavisor as well as the guest OS.

In an embodiment, the metavisor 300 interfaces to the guest OS 210 via a virtualized network adapter (e.g., a virtualized Ethernet device) for packet exchange. Virtual network interfaces are provided by the metavisor to enable exchange of standard packets and/or frames, such as Ethernet packets/frames. The metavisor obtains (e.g., usurps) a first virtual interface from the VMI and provides a second virtual interface to the guest OS so as to enable network traffic to move transparently between the guest OS and the computer network as well to/from the metavisor. Specifically, the virtual interfaces include a south-bound guest interface (SBG-IF 360) which is the interface between the hypervisor 125 and the metavisor 300 used primarily for guest OS traffic, and a north-bound guest interface (NBG-IF 370) which is the interface between the metavisor 300 and the guest OS 210, and represents the guest OS's network interface in the metavisor OS kernel. These interfaces represent the boundary of the network data path for purposes of the technique described herein. Note that the virtual network interfaces can be attached and removed dynamically, i.e., the existing hardware (physical) network adapter 130 may appear and disappear as new physical adapters are dynamically bound to the computing cell 250. The metavisor ensures that the virtual interfaces are synchronized and quiesced prior to network traffic flowing. The NBG-IF (controlled by the guest OS network protocol stack) may be initially configured identically to the SBG-IF (controlled by the metavisor network protocol stack), e.g., having a same protocol stack configuration setting, such as maximum transmission unit (MTU) size. Note, however, one or more of the configuration settings (e.g., MTU size) may be administratively changed on the SBG-IF, relative to the NBG-IF.

As noted, the hooks implementing the conditional tests and actions are called by the metavisor at particular points of processing of the packets, which points are illustratively associated with layers of the internet protocol (IP) stack, e.g., a link layer (L2) responsible for data link addressing using media access control (MAC) addresses, and a network layer (L3) responsible for IP addressing using IP addresses in which network flows may be exposed. To that end, the transparent deployment technique operates on network protocol stack 320 of the metavisor 300 configured with one or more of a L2 hook module ("L2 hook 312") and L3 hook module ("L3 hook 314") that may be called at particular points of packet processing such as, e.g., after transparent encryption/decryption 350 processing. Illustratively, the technique uses a "pfil" header framework of the network protocol stack 320 in order to attach the hooks at one or more pfil header points to capture inbound and outbound packets at various layers within the network stack. As will be understood by persons of skill in the art, other network stack packet capture techniques may be used to attach the hooks. When code execution reaches the pfil header point (e.g., after transparent encryption/decryption processing) any function or hook registered for that header is called with the packet. This hook is then used to redirect further (firewall) processing of the packet after decryption. In an embodiment, a framework of the metavisor, i.e., pfil, may be modified to add these hooks to certain points of code execution/processing of the packets, such as processing link layer information for the packet as well as network and transport layer information for the packet in each direction (e.g., north-south or south-north).

In an embodiment, one of the hooks (the L2 hook) is configured to examine a protocol type contained in the packet to identify a situation where it is uncertain whether a reply associated with a request originated at the guest OS or the metavisor, such as for a link layer protocol. An example of such a protocol is the address resolution protocol (ARP) (i.e., RFC 826 of the Internet Engineering Task Force).

According to the technique, the situation is resolved by sending the ARP reply to both the metavisor network protocol stack 320 and guest OS network protocol stack 230, as the ARP protocol permits. To that end, the technique provides a low-level (i.e., L2 or link layer) hook module that specifies "if the protocol of a reply packet is ARP, send the reply packet to both the metavisor and the guest OS". Illustratively, the L2 hook 312 is responsible for handling ARP replies and ensuring that only IP traffic is allowed to pass through the metavisor network protocol stack 320. The technique also provides a higher-level (L3 or network layer) hook module that is applied (called) when the protocol type of the packet is IP. Here, the network traffic packets are distinguished based on whether their network flows originated from or are destined to the metavisor 300 (or an external destination). If a determination is rendered that the network flows for externally originated packets inbound to the VMI (i.e., inbound on the SBG-IF so as to have a south-north direction) are associated with the metavisor, the packets are passed to the metavisor network protocol stack 320; otherwise, the packets are passed to the guest OS network protocol stack 230, bypassing at least a portion of the network protocol stack of the metavisor.

The determination of whether the network flows are associated with the metavisor, guest OS, or an external destination is performed by firewall functionality embodied as a packet filter (PF) of the metavisor. Illustratively, the firewall is a module that maintains flow state so as to identify a network flow. However, the firewall may also provide packet filtering services for security purposes, such as blocking ingress or egress packets, packet spoof detection, and IP address blacklisting. The L3 hook 314 operates on IP packets and calls into the firewall/packet filter 330 where the packets undergo inspection. A network flow of the packet is compared with state maintained at the firewall and, if a match occurs, a determination is rendered that the packet belongs to a flow that should be passed to the guest OS network protocol stack or the metavisor network protocol stack. As used herein, a network flow denotes a 5-tuple that includes information obtained from internet layer (IP) and transport layer (TCP and UDP) headers of the packet, such as source and destination IP addresses, as well as source and destination port numbers, and protocol type. Thus, packets within the network data path are passed through the firewall/PF 330 and tagged, which requires that the states maintained at the firewall contain information about the origin of the flows.

For packets received at the metavisor that originate at the guest OS (i.e., ingress on the NBG-IF in a north-south direction) and are destined to the computer network (i.e., to an external destination) via the hypervisor, state is created at the firewall that is modified with certain direction (outbound/egress) so that return packets received at the metavisor from the hypervisor are matched correctly with the modified state. That is, the L3 hook reverses direction of the packet prior to processing by the firewall. For example when the metavisor receives a packet originated from the guest OS (over the NB G-IF 370), the packet is "inbound" from the perspective of the metavisor 300. Yet, when that packet is sent over the computer network, state that is created corresponds to an "outbound" packet (from the perspective of the guest OS). However when the return packet is redirected into the metavisor, the state that is created corresponds to inbound traffic (even though the original packet corresponds to an inbound packet from the perspective of the metavisor). This problem results in an interesting challenge to create the correct state, particularly given the fact that only one hardware (MAC) address (as well as one network (IP) address) is provided to the guest OS (instead of two separate addresses). From the firewall perspective, the direction of the packet may be manipulated at the metavisor to rewrite the packet's direction (i.e., an "inbound" packet is modified to be an "outbound" packet and vice versa) for the purpose of creating firewall state. Note that from the perspective of the metavisor, the SBG-IF retains the hardware address assigned by the VMI as well as a network address, whereas the NBG-IF is not assigned a network address.

Comparison of the network flow of a packet with firewall state requires examination of unencrypted network traffic which, in turn, requires decryption of transparently encrypted incoming packets received at the metavisor from the VDC to obtain the original (5-tuple) network flow information. Based on that original flow information, a determination is rendered (i.e., firewall rules trigger) as to whether the network packet traffic is allowed or should be blocked. Standard network packet traffic typically passes through the firewall first, prior to decryption. According to the transparent deployment technique, unlike conventional network stacks, application of the firewall packet filter and transparent encryption/decryption (IPsec) operations are reordered to enable decryption first, prior to firewall processing, so that the firewall can operate on the non-encrypted network flow information. Decryption in this manner allows exposure of the transport layer (TCP or UDP) header information (which is normally hidden/encrypted using IPSec) and, particularly, the port numbers to correctly identify the network flow.

In accordance with the transparent deployment technique, the metavisor network protocol stack 320 contributes to the differentiation (i.e., distinguishing) of network packet traffic received on a virtual interface of the metavisor 300 using a MAC address shared with the guest OS 210 as traffic destined for the metavisor as opposed to traffic destined for the guest OS or an external destination. The virtual interface on which the packets arrive (i.e., the direction of the packets whether inbound or outbound) may also contribute to the differentiation of the traffic by, e.g., enabling rendering of decisions such as whether the packet is destined for the guest OS, the metavisor, or an external destination and, if the former, whether the guest packet is to be encrypted. For example, transparently encrypted network traffic received from the hypervisor (VDC) at the SBG-IF 360 may be forwarded to the guest OS 210 by redirecting or "forking" the packet to the guest OS network protocol stack 230 after modifying the packet through decryption. As part of the redirection function, the technique provides the ability to modify packet headers, port numbers or protocols. After decryption, the hooks are essentially used as forking functionality with respect to deciding which network protocol stack the packet is to be passed. These hooks or forks are used at different points of processing of a packet to determine to which protocol stack, i.e., the guest OS or metavisor, to pass the packet and to determine a next step of processing, i.e., whether or not to encrypt. Processing is thus performed by the firewall/packet filter 330 on a per-packet basis to render the decision of where to pass the packet. The pfil framework implemented on the metavisor network protocol stack 320 includes these additional hooks (or callbacks) registered at the protocol stack to perform certain functions.

The hooks within the metavisor network protocol stack 320 further operate to prevent the packet from normally flowing into the stack 320, where there is typically a daemon listening for the traffic. Such normal flow does not occur because the metavisor is not aware of what packets the guest OS sends. Therefore, the hooks are provided to process packets as they arrive on a virtual interface, e.g., inbound on the NBG-IF 370, to interface with the guest OS (from a network perspective) and ensure that those packets are sent to the VDC over another virtual interface, i.e., outbound on the SBG-IF 360, as the interface between the metavisor and hypervisor 125 (VDC). Notably, as the packets arrive at the metavisor on the interface between the hypervisor and metavisor, those packets are either "consumed" in the metavisor (as they are destined there) or forwarded to the NBG-IF virtual interface between the metavisor and guest OS.

Figure 4:
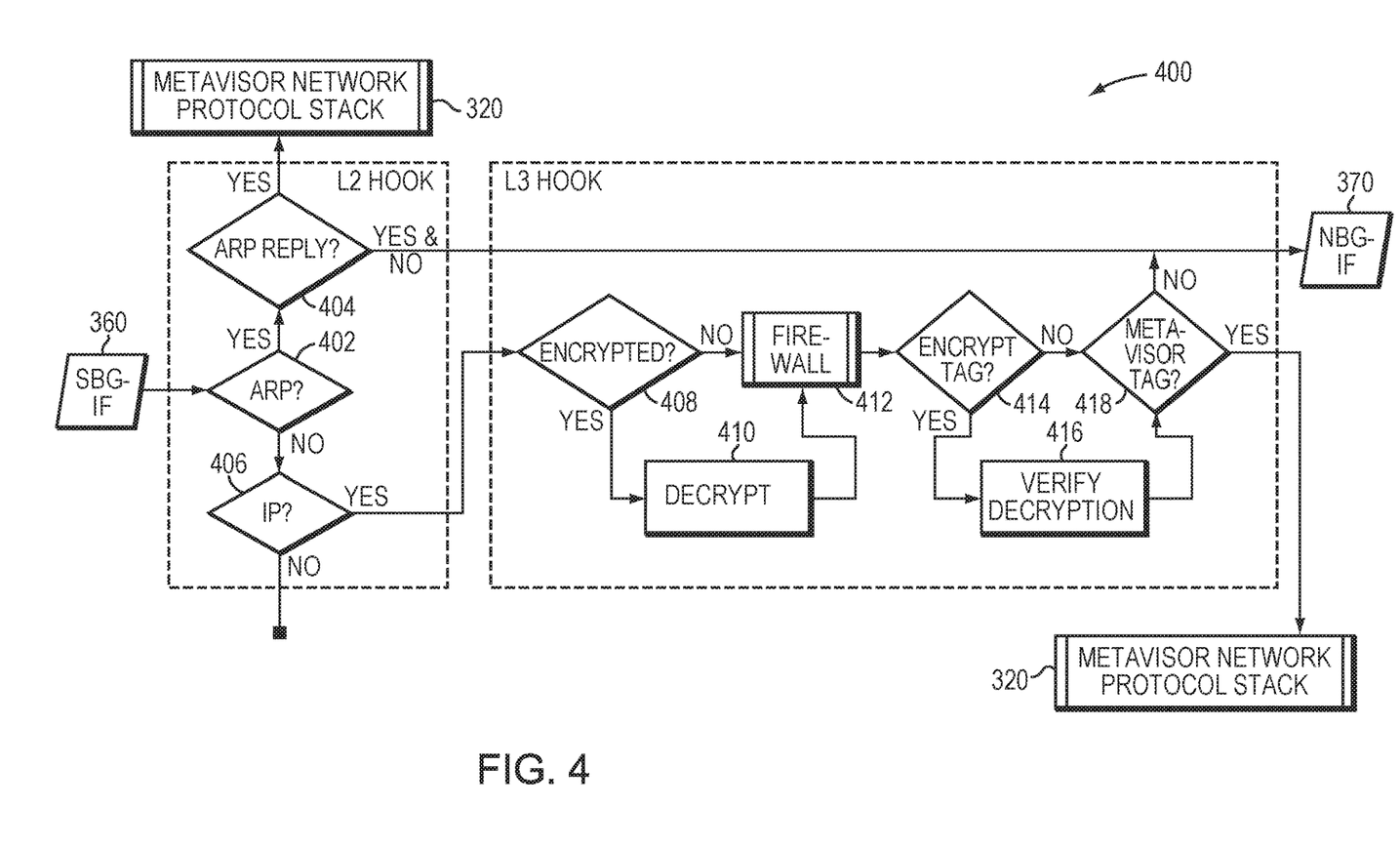
FIG. 4 is a flow diagram illustrating processing of incoming packet traffic received at the metavisor from the hypervisor.

FIG. 4 is a flow diagram illustrating processing 400 of (transparently encrypted) incoming packet traffic received at the metavisor from the hypervisor. A packet of the incoming traffic is received at the SBG-IF 360 (i.e., inbound south-north directed packet) and processed by the network protocol stack 320 where the L2 hook 312 is called to examine the packet (e.g., a Type field of an Ethernet frame header) and determine whether the protocol of the packet is ARP (decision box 402). If the protocol is ARP, processing of the packet proceeds to decision box 404 where the L2 hook determines whether the packet is an ARP reply (e.g., by examining an Operation field of the ARP packet). If so, the packet is passed to both the metavisor network protocol stack 320 and over the NBG-IF 370 to the guest OS network protocol stack 230, as the ARP protocol permits gratuitous replies. If the packet is not an ARP reply (e.g., an ARP request), the packet is only passed over the NBG-IF 370 to the guest OS network protocol stack 230. Note that the metavisor may receive ARP replies in response to issued ARP requests from the metavisor, so as to obtain Media Access Control (MAC) addresses to appropriately address packets on a same subnet. However, ARP requests need not be processed by the metavisor, but instead, may be answered by the guest OS network protocol stack via the NBG-IF that shares the same hardware address (e.g., MAC address) with the SBG-IF.

In an embodiment, the metavisor may provide ARP proxying (i.e., an ARP proxy server), such as for another OE having ARP services. In that case, all ARP packets arriving on the SBG-IF are directed into the metavisor and processed by the ARP proxy server. Note the metavisor proxy server may also exchange ARP packets with the guest OS.

If the determination at decision box 402 is that the protocol of the packet is not ARP, processing proceeds to decision box 406 where the L2 hook examines the packet (e.g., the Type field of the Ethernet frame header) to determine whether the protocol is IP. If not, the packet is not allowed to pass through the network protocol stack 320, i.e., the packet is blocked (ostensibly a malformed packet). If, however, the protocol of the packet is IP, then the L3 hook 314 is called to perform further tests and actions. In particular, a test is performed at decision box 408 to determine whether the packet is encrypted (i.e., encrypted by the metavisor). Note that packets encrypted by the guest OS are passed on to the firewall at box 412. If the packet is encrypted by the metavisor, the L3 hook calls into the transparent encryption/decryption subsystem 350 at box 410 to decrypt the packet. Once decrypted, the packet is processed by the firewall at box 412. Processing of the packet then proceeds to decision box 414 where it is determined whether the packet is tagged (encrypt tag) as part of a transparently encrypted flow and, thus, is expected to have been encrypted by the metavisor. If the packet is part of a transparently encrypted flow, decryption is verified at box 416; processing then proceeds to decision box 418 where it is determined whether the packet is tagged (e.g., a metavisor tag) for consumption by the metavisor. If so, the packet is passed to the metavisor network protocol stack 320; otherwise, the packet is passed over the NBG-IF 370 to the guest OS network protocol stack 230.

There may be situations where it is not possible to distinguish the network traffic at the network protocol stack 320 of the metavisor for protocols using fixed (i.e., predetermined) port numbers, such as domain name server (DNS) name lookup (e.g., RFC 1035 of the IETF), dynamic host configuration protocol (DHCP, e.g., RFC 2131 of the IETF) and network time protocol (NTP, e.g., RFC 1035 of the IETF). Both the guest OS 210 and metavisor 300 require the ability to lookup names and translate them to addresses. Typically, DNS requests from these OEs go to the same DNS name server, which has predetermined port numbers for the destination (and typically also for the source) in the TCP/UDP header. Since the metavisor and guest OS share the same IP address, there is no easy distinction between the network flows of that traffic. If both were to request name lookups at the same time, the firewall state alone is insufficient to distinguish the direction of the traffic (i.e., to which network stack the network traffic packets should be sent). Accordingly, the transparent deployment technique includes proxying by the proxy server 340 as a way to avoid distinguishing between such network flows. That is, for network protocols using predetermined port numbers, packets are proxied by the metavisor regardless of whether the metavisor or guest OS is a source of the packet. Upon receiving a packet having an indistinguishable network flow from the guest OS 210, the metavisor 300 proxies the packet to its intended destination, thereby ensuring that the reply is returned to the metavisor. In an embodiment, the proxy server may implement "foreign service" redirection to control the packet to/from an external destination in the computer network (e.g., a security gateway appliance), in which case, the network flow may be distinguishable.

For particular network flows, traffic can be directed into the metavisor 300 to be proxied, i.e., the metavisor sends the traffic on behalf of the guest OS 210 ensuring that all indistinguishable network flows are sourced by the metavisor. This aspect of the transparent deployment technique enables construction of a response by the metavisor to be sent back to the guest OS. That is, the metavisor network protocol stack 320 maintains sufficient information to construct the response to direct the packet to the correct protocol stack. For example, a DNS resolver (not shown) of the metavisor 300 may resolve queries or requests for both the guest OS and metavisor such that the proxy server 340 simply returns the response in a constructed form and shape that mimics the response it would have received if the response came directly from the DNS server. In effect, the metavisor 300 operates as a transparent DNS proxy.

Accordingly, classes of protocols are analyzed such as, for example, a DNS request which is proxied by the metavisor because its origin/destination is indistinguishable (e.g., protocols using predetermined TCP or UDP port numbers). As previously mentioned, other such problematic protocols may involve dynamic address resolution (DAR) protocol for which responses are sent to both the guest OS and metavisor; DHCP which includes predetermined port numbers that make it difficult to distinguish network flows; and NTP. These protocols, which are used by the metavisor to perform name resolution, obtain an IP address, and obtain the correct time, may be used to send responses to similar computers/nodes as that of the guest OS, causing potential problems. As noted previously, however, foreign service proxies may be used even when network flows are distinguishable.

Figure 5:
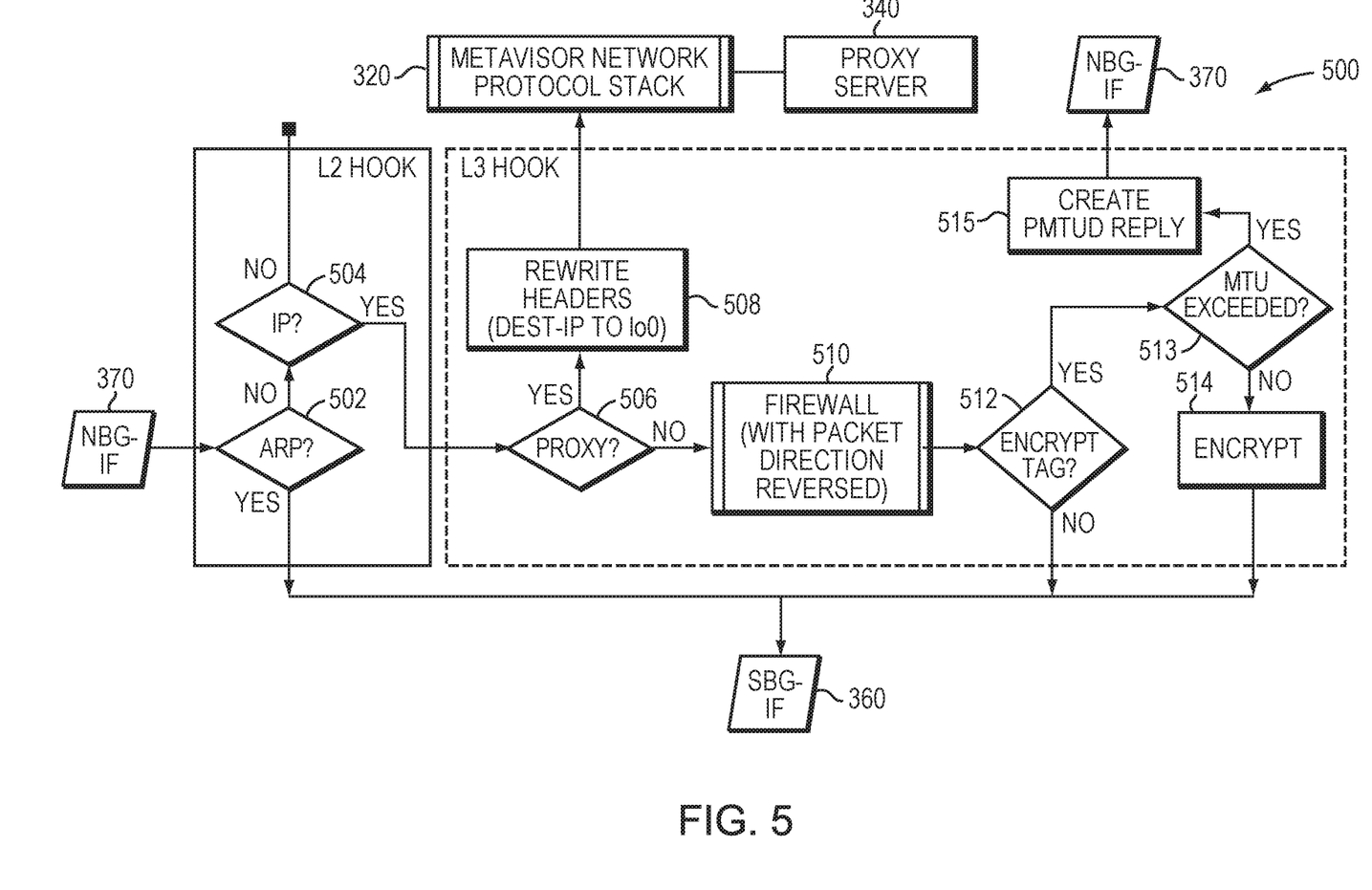
FIG. 5 is a flow diagram illustrating processing of outgoing packet traffic received at the metavisor from the guest OS.

FIG. 5 is a flow diagram illustrating processing 500 of outgoing packet traffic received at the metavisor from the guest OS (i.e., an inbound north-south directed packet). A packet of the outgoing traffic is received at the NBG-IF 370 and processed by the network protocol stack 320 where the L2 hook 312 is called to determine whether the protocol of the packet is ARP (decision box 502). If the protocol is ARP, e.g., an ARP request based on the Operation field of the ARP packet, the packet is passed over the SBG-IF 360 to the hypervisor 125 and onto the computer network. If the protocol is not ARP, processing proceeds to decision box 504 where the L2 hook determines whether the protocol is IP. If not, the packet is not allowed to pass through the protocol stack 320, i.e., the packet is blocked. If, however, the protocol of the packet is IP, then the L3 hook 314 is called to perform further tests and actions. Specifically, a test is performed at decision box 506 to determine whether packet should be proxied. If so, the destination address of the IP header of the packet is rewritten to the IP address of a loopback interface (i.e., local host lo0) of the metavisor 300 (box 508) to link the proxied data path to the north-south (NB G-IF, SBG-IF) data path. The packet is then passed through the metavisor network protocol stack 320 where it is delivered to the proxy server 340.

If a determination is rendered that the packet should not be proxied (decision box 506), processing proceeds to box 510 where the L3 hook calls into the firewall 330 to process the packet. However, the packet direction is reversed prior to processing by the firewall. Since the packet was received on the NB G-IF, the firewall performs processing to create egress state (not ingress) for the packet so that a corresponding return packet, ingress on the SBG-IF, is matched up correctly with the proper state. Specifically, ingress packets received on the NBG-IF are forwarded to the firewall as if they were egress packets on the NBG-IF. Processing of the packet then proceeds to decision box 512 where it is determined whether the packet is tagged (encrypt tag) as part of an encrypted flow. When the metavisor encrypts guest OS network traffic transparently, the (unencrypted) packet received on the NBG-IF 370 may grow to include extra headers and trailers, e.g., Encapsulating Security Payload (ESP) header and trailer, as well as additional data such as integrity check values and/or padding. As such, if the packet is tagged for encryption, processing of the packet proceeds to decision box 513 where a determination is rendered as to whether the encrypted packet would exceed the maximum transfer unit (MTU) of the SBG-IF.

If not, the packet is (transparently) encrypted at box 514 and sent over the SBG-IF 360. However, if the MTU is exceeded, the packet is rewritten into a Path MTU Discovery (PMTUD) reply (packet) at box 515 (as per RFC 1191 of the IETF) and sent over the NBG-IF 370 to the guest OS. In an embodiment, both the SBG-IF 360 and the NBG-IF 370 have a same MTU, which defines the maximum length of any IP packet that allowed to be sent over the interface. Note, however, the MTU of the NB G-IF may optionally be lowered by the guest OS 210 to account for limitations in the computer network so as to minimize fragmentation of IP packets during transit. The MTU of the SBG-IF 360 may be determined by the physical or logical limitations of the is implementation of the virtual network adapters provided by the VMI, combined with MTU settings obtained from the network, e.g., using DHCP. The MTU of the NBG-IF 370 is preferably set to match the MTU of the SBG-IF 360 to prevent the metavisor 300 from having to implement IP packet fragmentation functionality for unencrypted IP packets. If the MTU of the NBG-IF 370 were larger than the MTU of the SBG-IF 360, the metavisor 300 may need to fragment packets coming from the NBG-IF 370, so that they may fit in the smaller MTU of the SBG-IF 360. Likewise, if the MTU of the NBG-IF 370 were smaller than the MTU of the SBG-IF 360, the metavisor 300 may need to fragment packets coming from the SBG-IF 360, so that they may fit in the MTU of the NBG-IF 370.

Given the MTU of the NBG-IF 370, an unencrypted IP packet that assumes the maximum length may grow beyond that maximum length as a side-effect of encryption and, as such, cannot be sent over the SBG-IF 360. In this case, the metavisor 300 may fragment the encrypted IP packet and send it out as two Ethernet frames/packets (both of which would be substantially smaller than the MTU); however, such fragmentation would reduce the efficiency of the network and impact performance. To prevent fragmentation for transparently encrypted traffic, the metavisor 300 illustratively employs PMTUD as per RFC 1191. When encryption is to be performed on a packet and the resulting (encrypted) IP packet would exceed the MTU of the SBG-IF 360, the metavisor sends an appropriate ICMP packet (e.g., a PMTUD reply packet) to the guest OS 210, informing the guest OS of a resized MTU to assume for the network flow in order to prevent fragmentation (due to encryption). Upon receipt of the PMTUD reply, the guest OS 210 may thereafter retransmit the data in smaller IP packets. Transparent encryption is thus possible without exceeding the MTU of the SBG-IF 360. With transparent encryption occurring on a per-flow basis and PMTUD targeting specific network flows, the guest OS 210 is able to fully utilize the MTU for unencrypted traffic and assume a smaller MTU (as per the PMTUD information from the metavisor 300) for those flows that the metavisor transparently encrypts.

Figure 6:
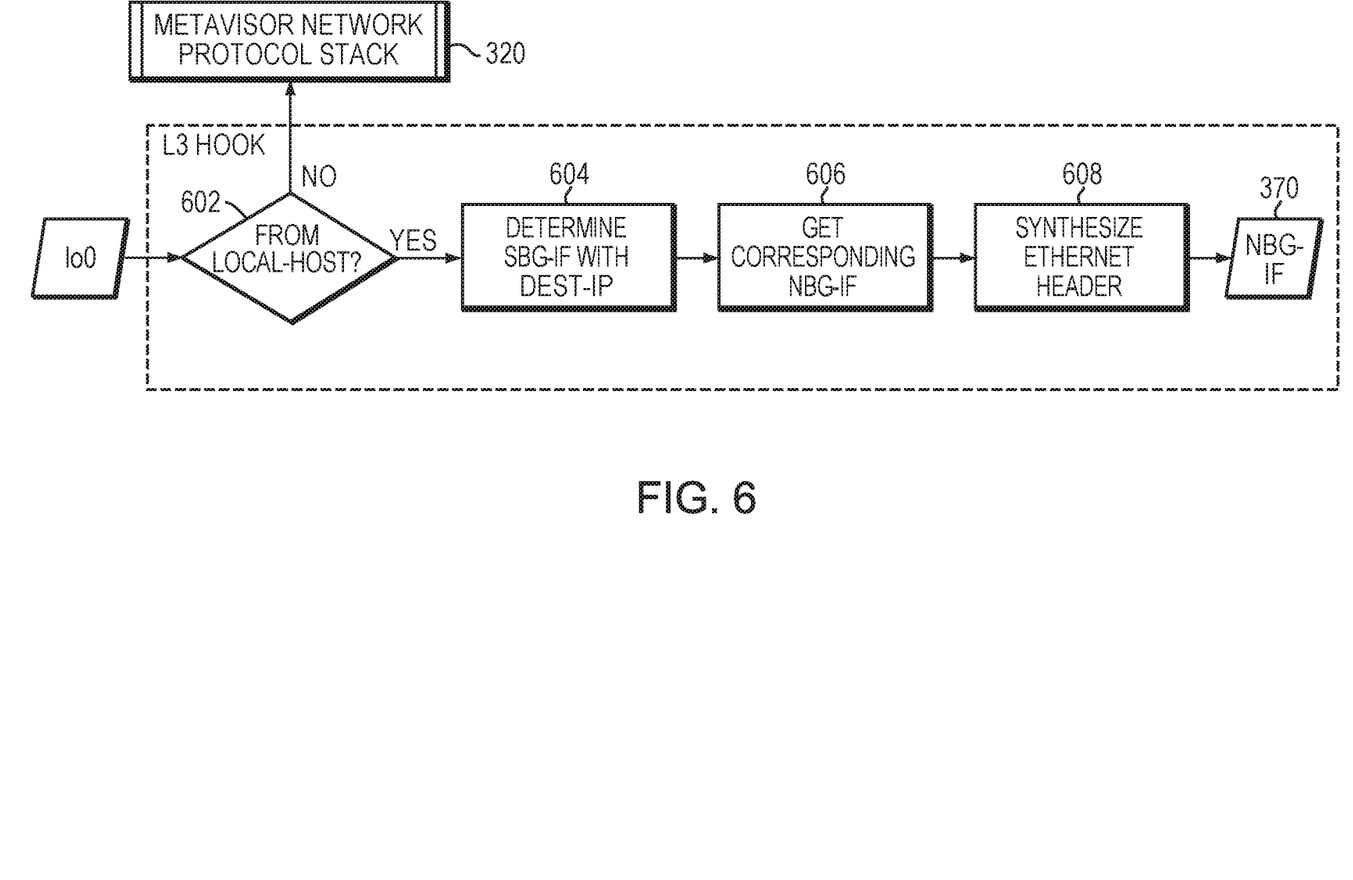
FIG. 6 is a flow diagram illustrating processing of outgoing packet traffic on a loopback interface of the metavisor.

FIG. 6 is a flow diagram illustrating processing 600 of outgoing packet traffic on the loopback interface (lo0 i.e., having reserved IP address 127.0.0.1) of the metavisor. Packets (requests) of the redirected traffic have their destination IP addresses in the IP headers rewritten to "local host". Reply packets have the source and destination IP addresses swapped, such that the replies come from the local host and are destined to the IP address of the SBG-IF 360. Note that only the SBG-IF has an IP address. With the destination IP address local to the metavisor, the metavisor network protocol stack 320 may route the packets to the loopback interface lo0, where the L3 hook processes and delivers the packets to the NBG-IF 370.

Thus, at decision box 602, the L3 hook is called to determine whether a reply packet is sourced from the local host (i.e., metavisor). If not, the packet is passed to the metavisor network protocol stack. If the reply packet is sourced from the local host, the destination IP address is used to locate the SBG-IF at box 604 (e.g., when a plurality of SBG-IFs are provided by the VMI to the metavisor) and, at box 606, the corresponding NBG-IF is obtained. In an embodiment, the first header of a packet on the loopback interface is the IP header because there is no link layer associated with the loopback interface. Accordingly, the packet on the loopback interface does not have a link layer (Ethernet) header and, thus, no source and destination MAC addresses. Since no network protocol stack examines the source MAC address for ingress packets, the L3 hook creates a source MAC address of all zeros. If the guest OS needs to use the source MAC address, the destination MAC address of the redirected packet (request) is placed in a synthesized Ethernet header (box 608) as the source MAC address for a reply packet.

Advantageously, the transparent deployment technique provides hooks that enable directional injection of the packets into the correct network protocol stack or acceptance of the packets from a stack while ensuring that return packets are forwarded to the correct stack or egress interface. Such directional processing is based, in part, on static rules (i.e., hard coded expressions) and, more generally, on established flows using state created by the firewall. For example, packets passing through the firewall are processed in accordance with packet filter rules which are queried. If the rules indicate that a packet is allowed to pass, standard state is created that automatically allows passage of return packets having the same network flow to the guest OS. Attached to such standard firewall state is additional state (e.g., tags) that informs the hooks (or more generally the metavisor kernel) whether the standard state was created on behalf of the metavisor packet traffic (network flow) or guest OS traffic (network flow). This additional state is queried in the hooks (e.g., tags are examined) to determine where to send the traffic i.e., which network stack. Thus, a combination of static logic (e.g., for ARP) and firewall state (e.g., for IP, UDP, TCP) may be used to distinguish the metavisor traffic (flows) from the guest OS traffic (flows).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   a virtual machine instance (VMI);
   a processor;
   a network adapter coupled to the processor and having a hardware address used to establish a network data path configured to exchange packets over a computer network; and
   a memory coupled to the processor and network adapter, the memory configured to store a guest operating system (OS) of the VMI, a hypervisor, and an intermediary manager adapted for execution by the processor in an arrangement wherein the intermediary manager is disposed between the hypervisor and the guest OS, further wherein the intermediary manager is located within the VMI and outside of the guest OS of the VMI, the hypervisor configured to manage resources of the system including the network adapter to enable sharing of the hardware address between the intermediary manager and the guest OS to exchange the packets over the network data path, the intermediary manager configured to process the packets received over the network data path to differentiate the packets as directed to one of the intermediary manager and the guest OS to thereby transparently deploy the intermediary manager into the network data path, wherein the intermediary manager provides one or more hooks, the one or more hooks configured to enable forking of the packets between a network protocol stack of the intermediary manager and a network protocol stack of the guest OS.

2. The system of claim 1 wherein the one or more hooks are called at points of processing of the packets by the intermediary manager to inspect the packets at the points and to determine whether the packets are part of network traffic directed to one of the intermediary manager and the guest OS.

3. The system of claim 2 wherein the one or more hooks are configured to provide tests and actions on the packets to enable forking of the packets such that the guest OS is unaware of a presence of the intermediary manager within the network data path.

4. The system of claim 2 wherein a first hook of the one or more hooks is applied to examine a protocol type contained in each of the packets to identify a situation where it is uncertain whether a reply packet associated with a request packet originated at one of the guest OS and the intermediary manager.

5. The system of claim 2 wherein a second hook of the one or more hooks is applied when a protocol type of a packet of the packets is an internet protocol (IP), the second hook configured to distinguish the packets of the network traffic based on network flows of the packets.

6. The system of claim 5 wherein a network flow comprises a tuple that includes information obtained from internet layer and transport layer headers of the packet, wherein the information includes source and destination IP addresses, source and destination port numbers, and protocol type.

7. The system of claim 5 wherein the second hook calls into a firewall of the intermediary manager where a network flow of the packet is compared with state maintained at the firewall and, if a match occurs, the packet is tagged and passed to one of a network protocol stack of the guest OS and a network protocol stack of the intermediary manager.

8. The system of claim 7 wherein the state maintained at the firewall contains information about an origin of the network flow.

9. The system of claim 5 wherein the second hook calls into a firewall for the packet received at the intermediary manager that originates at the guest OS and is destined to the computer network via the hypervisor, the firewall configured to create state modified with certain direction so that a return packet received at the intermediary manager from the hypervisor is matched correctly with the modified state.

10. The system of claim 1, wherein the intermediary manager is configured to determine whether the packets are part of network traffic directed to one of the intermediary manager and the guest OS.

11. The system of claim 1, wherein the intermediary manager is configured to examine a protocol type contained in each packet to identify a situation where it is uncertain whether a reply packet associated with a request packet originated at one of the guest OS and the intermediary manager, wherein the situation is resolved by sending the reply packet to both a network protocol stack of the guest OS and a network protocol stack of the intermediary manager.

12. The system of claim 1, wherein the intermediary manager is configured to distinguish the packets as directed to one of the intermediary manager and the guest OS based on network flows of the packets, wherein the distinguishing is performed when a protocol type of the packets is an internet protocol (IP).

13. A method comprising:
establishing a network data path using a hardware address to exchange packets over a computer network coupled to a network adapter of a computer system;
storing a guest operating system (OS) of a virtual machine instance (VMI) of the computer system, a hypervisor, and an intermediary manager in a memory of the computer system, the intermediary manager disposed between the hypervisor and the guest OS, wherein the intermediary manager is located within the VMI and outside of the guest OS of the VMI;
managing the network adapter at the hypervisor to enable sharing of the hardware address between the intermediary manager and the guest OS to exchange the packets over the network data path; and
processing the packets received over the network data path by the intermediary manager to differentiate the packets as directed to one of the intermediary manager and the guest OS to thereby transparently deploy the intermediary manager into the network data path, wherein the intermediary manager provides one or more hooks, the one or more hooks configured to enable forking of the packets between a network protocol stack of the intermediary manager and a network protocol stack of the guest OS.

14. The method of claim 13 wherein processing the packets comprises:
calling the one or more hooks at points of processing of the packets to determine whether the packets are part of network traffic directed to one of the intermediary manager and the guest OS.

15. The method of claim 14 wherein calling the one or more hooks comprises:
providing tests and actions on the packets to enable forking of the packets such that the guest OS is unaware of a presence of the intermediary manager within the network data path.

16. The method of claim 14 wherein calling the one or more hooks comprises:
applying a first hook of the one or more hooks to examine a protocol type contained in each packet to identify a situation where it is uncertain whether a reply packet associated with a request packet originated at one of the guest OS and the intermediary manager.

17. The method of claim 14 wherein calling the one or more hooks comprises:
applying a second hook of the one or more hooks when a protocol type of a packet of the packets is an internet protocol to distinguish the packets of the network traffic based on network flows of the packets.

18. The method of claim 17 wherein applying the second hook comprises:
calling into a firewall of the intermediary manager where a network flow of the packet is compared with state maintained at the firewall; and
in response to a match, tagging the packet to pass the packet to one of a network protocol stack of the guest OS and a network protocol stack of the intermediary manager.

19. The method of claim 18 wherein the state maintained at the firewall contains information about an origin of the network flow.

20. A non-transitory computer readable media containing instructions for execution on a processor for a method comprising:

establishing a network data path using a hardware address to exchange packets over a computer network coupled to a network adapter of a computer system;

storing a guest operating system (OS) of a virtual machine instance (VMI) of the computer system, a hypervisor and an intermediary manager in a memory of the computer system, the intermediary manager disposed between the hypervisor and the guest OS, wherein the intermediary manager is located within the VMI and outside of the guest OS of the VMI;

managing the network adapter at the hypervisor to enable sharing of the hardware address between the intermediary manager and the guest OS to exchange the packets over the network data path; and processing the packets received over the network data path by the intermediary manager to differentiate the packets as directed to one of the intermediary manager and the guest OS to thereby transparently deploy the intermediary manager into the network data path, wherein the intermediary manager provides one or more hooks, the one or more hooks configured to enable forking of the packets between a network protocol stack of the intermediary manager and a network protocol stack of the guest OS.

* * * * *